(12) United States Patent
Krejci

(10) Patent No.: US 6,691,962 B1
(45) Date of Patent: Feb. 17, 2004

(54) HIDDEN MOUNT APPARATUS FOR MOTORCYCLE GAS TANK

(76) Inventor: Kyle P. Krejci, 120 W. Shannon St., Gilbert, AZ (US) 85233-8725

( * ) Notice: Subject to any disclaimer, the term of this patent is extended or adjusted under 35 U.S.C. 154(b) by 0 days.

(21) Appl. No.: 10/377,634

(22) Filed: Mar. 4, 2003

(51) Int. Cl.[7] ............................. F21V 35/00; B60P 3/22
(52) U.S. Cl. ..................... 248/214; 180/219; 280/835
(58) Field of Search ..................... 248/214, 316.7, 248/200, 300; 180/219; 280/830, 835

(56) References Cited

U.S. PATENT DOCUMENTS

| | | | | |
|---|---|---|---|---|
| 3,926,274 A | * | 12/1975 | Morioka et al. | 180/219 |
| 4,135,724 A | * | 1/1979 | Larsen | 280/830 |
| 4,311,261 A | * | 1/1982 | Anderson et al. | 224/418 |
| 4,401,309 A | * | 8/1983 | Matsuzaki et al. | 280/835 |
| 4,449,723 A | * | 5/1984 | Shiratsuchi | 280/833 |
| 4,461,489 A | * | 7/1984 | Tsukiji et al. | 280/835 |
| 4,469,190 A | * | 9/1984 | Yamaguchi | 180/219 |
| 4,717,163 A | * | 1/1988 | Tsukiji | 280/835 |
| 5,593,126 A | * | 1/1997 | Muderlak | 248/316.7 |
| D390,183 S | * | 2/1998 | Manwill | D12/218 |
| 5,944,216 A | * | 8/1999 | Inaoka et al. | 220/562 |
| 6,056,343 A | * | 5/2000 | Cairns | 294/159 |
| 6,381,823 B1 | * | 5/2002 | Krejci | 29/416 |
| 6,478,335 B2 | * | 11/2002 | Reed | 280/835 |

FOREIGN PATENT DOCUMENTS

JP 06115475 A * 4/1994

* cited by examiner

Primary Examiner—Anita King
(74) Attorney, Agent, or Firm—H. Gordon Shields

(57) ABSTRACT

Hidden mounting apparatus for securing a gas tank to a motorcycle chassis includes mounting brackets secured to the gas tank on opposites sides of a tunnel on the gas tank. The mounting brackets extend into the gas tank and receive ends of a mounting plate which is secured to the motorcycle chassis. Bolts extend through the mounting plate and into threaded bores in the mounting brackets. A cover plate extends over the mounting plate and is secured to the mounting brackets to cover the entire assembly. Bushings in the mounting plate help to dampen vibrations between the chassis and the tank.

13 Claims, 2 Drawing Sheets

HIDDEN MOUNT APPARATUS FOR MOTORCYCLE GAS TANK

BACKGROUND OF THE INVENTION

1. Filed of the Invention

This invention relates to motorcycle gas tanks, and more particularly, to motorcycle gas tank mounting elements.

2. Description of the Prior Art

Motorcycle gas tanks are typically secured to the backbone of a motorcycle frame. A strap is typically welded to the backbone and the gas tank includes fittings which secure the tank to the strap. The gas tank includes a tunnel, and the tunnel divides the tank into two halves. The mounting fittings are secured on either side of the tunnel to the two halves of the tank. The mounting fittings of the prior art are flush with the bottom of the tank halves, and are in plain sight on the bottom of the tank.

The mounting apparatus of the present invention are recessed into the bottom of the two tank halves and are thus hidden from sight, providing a smooth bottom surface for the tank.

SUMMARY OF THE INVENTION

The apparatus of the present invention comprises mounting apparatus for a motorcycle gas tank in which mounting elements are recessed into the bottom of a gas tank on opposite sides of a tank tunnel. The recessed elements receive a strap which is secured to the backbone of the motorcycle and the tank and the strap and backbone are secured together by bolts. A cover plate is then bolted or screwed to the strap to cover the elements, thus "hiding" the mounting elements.

Among the objects of the present invention are the following:

To provide new and useful gas tank apparatus for a motorcycle;

To provide new and useful mounting apparatus for mounting a gas tank to a motorcycle;

To provide new and useful hidden elements for securing a gas tank to a motorcycle;

To provide new and useful mounting elements for a motorcycle gas tank;

To provide new and useful recessed mounting elements for a motorcycle gas tank; and To provide new and useful motorcycle gas tank elements for securing the tank to the backbone of a motorcycle.

DESCRIPTION OF THE PREFERRED EMBODIMENT

Figure 1:
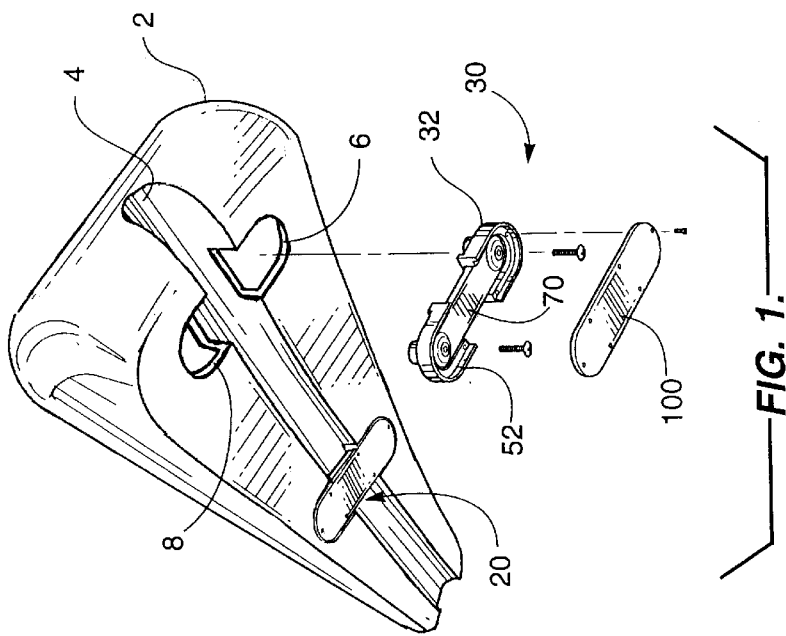
FIG. 1 is a bottom perspective view of a motorcycle gas tank with a portion of the apparatus of the present invention exploded away from the tank.

FIG. 1 is a bottom perspective view of a motorcycle gas tank 2. The tank 2 includes a tunnel 4 which divides the gas tank into two halves. For mounting the tank 2 to a motorcycle chassis, the tunnel 4 receives the backbone of the chassis (not shown), as is well known and understood in the motorcycle art.

Figure 2:
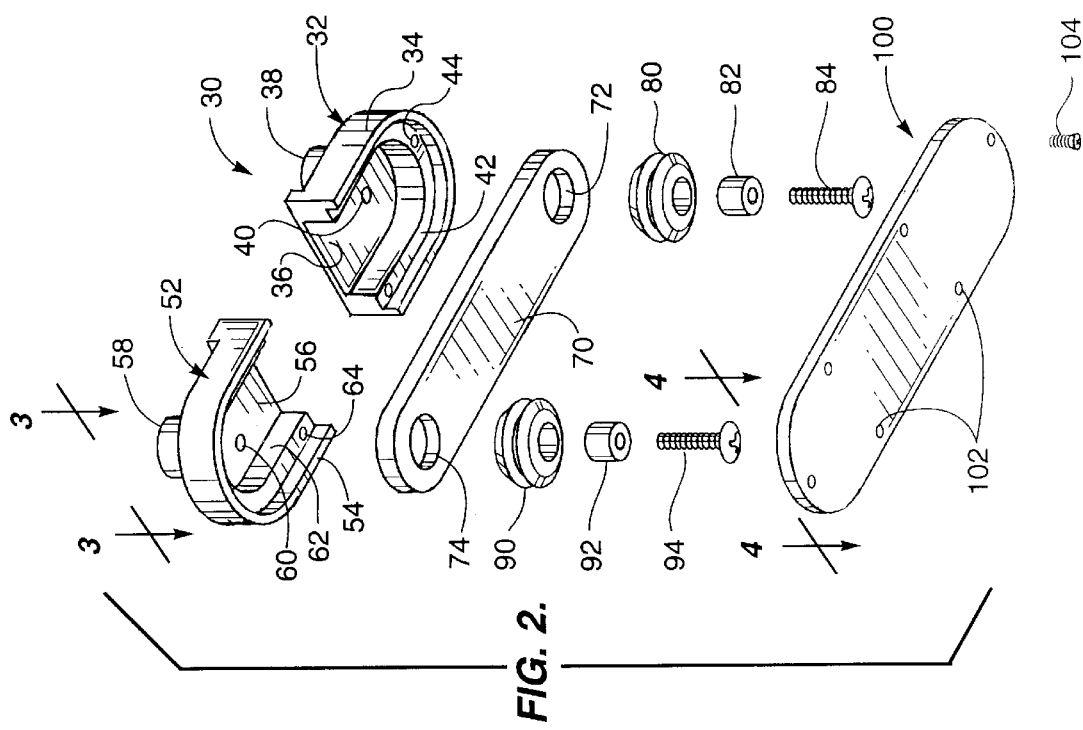
FIG. 2 is an exploded perspective view of the apparatus of the present invention.
Figure 3:
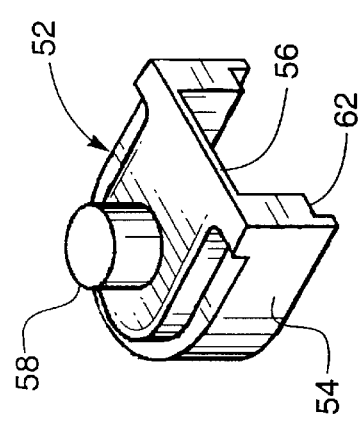
FIG. 3 is a bottom perspective view of a portion of the present invention, taken generally along line 3—3 of FIG. 2.
Figure 5:
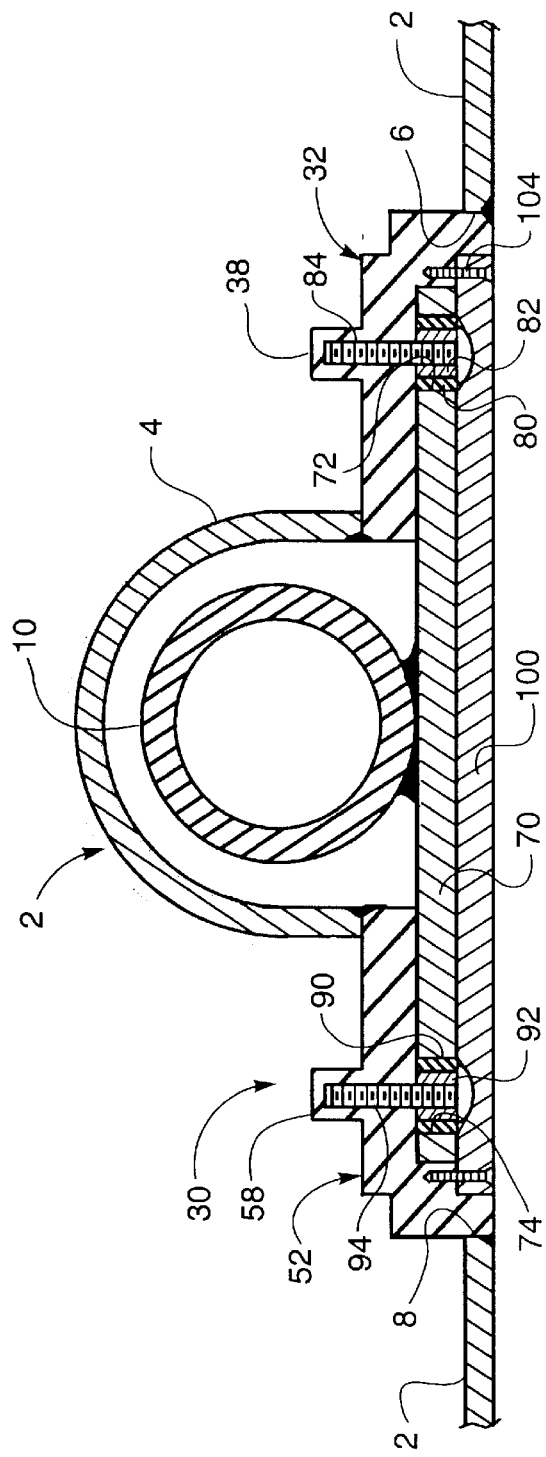
FIG. 5 is a sectional view of a portion of the apparatus of the present invention in its use environment.

Typically, the gas tank is secured to the backbone at two locations, a front location and a rear location. In FIG. 1, a rear mounting unit 20 is shown secured to the tank 2 and a front mounting unit or assembly 30 is shown spaced apart from a pair of cut out portions 6 and 8. FIG. 2 is an exploded perspective view of the mounting assembly 30. FIG. 3 is a bottom perspective view of a portion of the mounting assembly 30. FIG. 5 is a sectional view of the gas tank 2 illustrating the relationship between the apparatus of the present invention and the gas tank 2 and a tubular backbone 10 of a motorcycle chassis. For the following discussion, reference will generally be made to FIGS. 1, 2, 3, and 5.

The mounting assembly 30 includes two mounting brackets 32 and 52. The brackets 32 and 52 are welded into the cutout portions 6 and 8, respectfully. The brackets 32 and 52 are thus recessed into the tank 2 from the bottom of the tank.

The bracket 32 includes a u-shaped element 34 and a bottom plate 36. A boss 38 extends outwardly from the bottom plate 36. A threaded bore 40 extends through the plate 36 and into the boss 38. The threaded bore 40 receives a bolt or screw 84, as will be discussed below.

The mounting bracket 52 is substantially identical to the bracket 32. The bracket 52 includes a u-shaped element 54 which is welded into the recess 8. The u-shaped element 54 includes a bottom plate 56 and a boss 58. The boss 58 extends outwardly from the plate 56. A threaded bore 60 extends into the boss from the plate 56, and receives a screw or bolt 94, as will be discussed below.

A strap 70 includes two apertures 72 and 74. The strap 70 includes rounded ends which extend into the mounting brackets 32 and 52. The strap 70 is dimensioned to extend into the brackets 32 and 52 and rest on the bottom plates 36 and 56.

The strap 70 may be welded directly onto the backbone 10 of a motorcycle chassis, as shown in FIG. 5, or the strap may be cut into two lengths and welded to the sides of the backbone, depending on the particular design of the motorcycle chassis and the gas tank. In any event, the strap 70, as welded to the backbone, is dimensioned to extend into the brackets 32 and 52 and to be disposed against the bottom plates 36 and 56. The strap 70 is thus a mounting plate secured to the motorcycle chassis for mounting the tank 2 to the motorcycle chassis.

The apertures 72 and 74 receive bushings for absorbing or dampening vibrations from the motorcycle chassis. A pair of bushings 80 and 90 are shown in FIG. 2 spaced apart from the apertures 72 and 74, respectfully. The bushings are typically rubber, but may be made of any appropriate material. Center bores extend through the bushings and receive inserts 82 and 92, respectively. Screws or bolts 84 and 94 then extend through the inserts and the bushings and into the threaded bores 40 and 60, respectively. The screws or bolts 84 and 94 thus secure the tank 2 to the motorcycle chassis (not shown). The bushings 80 and 90 through which the screws or bolts 84 and 94 extend allow only a minimum amount of vibration to be transmitted to the gas tank from the chassis.

The mounting brackets 32 and 52 include recessed rims or shoulders 42 and 62, respectively. The recessed rims or shoulders 42 and 62 include threaded holes 44 and 64, respectively, which extend downwardly into the u-shaped elements 34 and 54 from the respective recessed rims. The recessed rims are dimensioned to receive a cover plate 100. The cover plate 100 includes holes 102 which are aligned with the threaded holes 44 and 64 in the recessed rims.

Screws or bolts 104 then extend through the holes 102 and into the threaded holes 44 and 64 to secure the cover plate to the mounting brackets 32 and 52. The thickness of the cover plate 100 is dimensioned to fit onto the mounting brackets 32 and 52 and be disposed on the recessed rims 42 and 52 to provide a flush fit with the bottom of the tank 2, thus hiding the mounting apparatus for securing the tank 2 to a motorcycle chassis.

The cover plate 100 shows three holes 102 at each end of the plate. The holes 102 correspond to the threaded holes 44 and 64 in the recessed rims 42 and 62 of the brackets 32 and 52, respectively.

Figure 4:
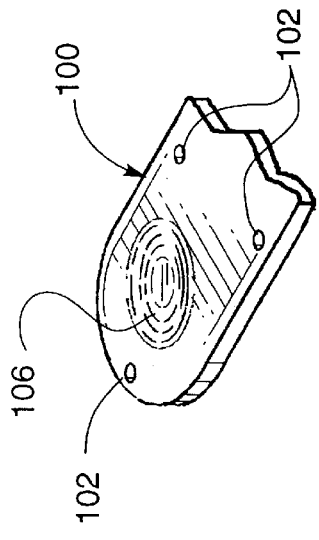
FIG. 4 is a perspective view of a portion of the apparatus of the present invention, taken generally along line 4—4 of FIG. 2.

FIG. 4 is a view of a portion of the cover plate 100 showing a recess 106 for a screw head. The cover plate 100 includes two such recesses 106, one for the head of the screw or bolt 84 and one for the head of the screw or bolt 94. The recesses 106 are on the bottom of the plate. The recesses 106 thus allow the cover plate 100 to be flush on the rims 42 and 62 of the brackets 32 and 52, respectively, thus hiding the mounting elements for the tank 2.

While the principles of the invention have been made clear in illustrative embodiments, without departing from those principles there may occur to those skilled in the art modifications of structure, arrangement, proportions, the elements, materials, and components used in the practice of the invention, and otherwise, which are particularly adapted to specific environments and operative requirements. The appended claims are intended to cover and embrace any and all such modifications within the limits only of the true spirit and scope of the invention.

What I claim is:

1. Mounting apparatus for mounting a gas tank to a motorcycle chassis, comprising in combination:
    a first bracket secured to a portion of the gas tank and extending into the tank;
    a first bottom plate on the first bracket;
    a first threaded bore in the first bottom plate;
    a second bracket secured to another portion of the gas tank and extending into the tank and aligned with the first bracket;
    a second bottom plate on the second bracket;
    a second threaded bore in the second bottom plate;
    a mounting plate secured to the motorcycle chassis, including a pair of apertures aligned with the first and second threaded bores in the first and second bottom plates; and
    a first bolt and a second bolt extending through the aligned apertures in the mounting plate and into the first and second threaded bores, respectively, for securing the gas tank to the motorcycle chassis.

2. The apparatus of claim 1 which further includes a first and a second bushing secured to the mounting plate through which the first and second bolts extend for dampening vibrations between the chassis and the gas tank.

3. The apparatus of claim 1 which further includes a cover plate securable to the first and second brackets for covering the mounting plate and the first and second bolts.

4. The apparatus of claim 3 in which the cover plate is flush with the gas tank when it is secured to the first and second brackets.

5. The apparatus of claim 3 in which the first and second brackets include a recessed rim for receiving the cover plate.

6. The apparatus of claim 3 which further includes means for securing the cover plate to the first and second brackets.

7. The apparatus of claim 1 in which the gas tank includes a tunnel, and the first and second brackets are disposed on opposite sides of the tunnel.

8. The apparatus of claim 1 in which the first and second bottom plates include first and second bosses extending outwardly from the respective bottom plates, and the first and second threaded bores extend into the respective first and second bosses.

9. The apparatus of claim 1 which further includes a first and a second bushing each of which has an aperture extending through the bushing, and a first and a second insert is disposed in the first and second apertures, respectively, and the first and second bolts extend through the first and second apertures, respectively, for securing the gas tank to the motorcycle chassis.

10. In a motorcycle gas tank having a tunnel, hidden mounting apparatus for securing the gas tank to the backbone of a motorcycle chassis comprising in combination:
    a first mounting bracket secured to the gas tank on one side of the tunnel and extending into the gas tank, including
        a first u-shaped element,
        a first bottom plate on the first u-shaped element,
        a first threaded bore extending through the first bottom plate,
    a second mounting bracket secured to the gas tank opposite the first mounting bracket with respect to the tunnel and extending into the gas tank, including
        a second u-shaped element,
        a second bottom plate on the second u-shaped element,
        a second threaded bore extending through the second bottom plate;
    a mounting plate secured to the backbone of the motorcycle chassis, including a first aperture and a second aperture aligned with the first and second threaded bores, respectively; and
    threaded fastening elements extending through the first and second apertures in the mounting plate and into the first and second threaded bores in the first and second mounting brackets, respectively.

11. The apparatus of claim 10 which further includes a first bushing and a second bushing extending through the first and second apertures, respectively, of the mounting plate for dampening vibrations of the motorcycle chassis.

12. The apparatus of claim 11 which further includes a cover plate secured to the first and second mounting brackets covering the mounting plate.

13. The apparatus of claim 12 in which the first and second mounting brackets each include a recessed rim, and the cover plate is disposed on the recessed rims.

* * * * *